Sept. 19, 1944.     L. E. SODERQUIST     2,358,764
VULCANIZING PRESS
Filed May 22, 1943     3 Sheets-Sheet 1

INVENTOR
LESLIE E. SODERQUIST
BY
ATTORNEY

Sept. 19, 1944.  L. E. SODERQUIST  2,358,764
VULCANIZING PRESS
Filed May 22, 1943  3 Sheets-Sheet 2

INVENTOR
LESLIE E. SODERQUIST
BY
Ely & Frye
ATTORNEY

Sept. 19, 1944.  L. E. SODERQUIST  2,358,764
VULCANIZING PRESS
Filed May 22, 1943  3 Sheets-Sheet 3

INVENTOR
LESLIE E. SODERQUIST
BY
Elys Frye
ATTORNEY

Patented Sept. 19, 1944

2,358,764

UNITED STATES PATENT OFFICE 2,358,764

VULCANIZING PRESS

Leslie Edward Soderquist, Akron, Ohio, assignor to The McNeil Machine & Engineering Company, Akron, Ohio, a corporation of Ohio Application May 22, 1943, Serial No. 488,304

14 Claims. (Cl. 18—17)

The present invention relates to presses for use in the vulcanization of rubber articles, particularly pneumatic tires for which the invention shown herein is adapted and intended.

In the vulcanization of pneumatic tires, the use of a steam chest or steam dome type of vulcanizer has more recently become popular, particularly in the vulcanization of tires made in whole or in large part of synthetic rubbers. It has been found that more efficient and effective vulcanization can be secured if the mold in which the tire is vulcanized is completely enclosed in a chamber so that the mold can be cooled by water sprays before it is opened after vulcanization. This type of press is also desirable for it enables the tire manufacturer to utilize old individual molds such as were formerly used in pot heaters or vulcanizers.

It is an object of the invention to provide a press of the steam chamber or steam dome type in which the lower mold section is attached to a stationary support and the upper mold section suspended from an adjustable platen, the entire unit being enclosed in a chamber, the walls of which are insulated. In order to adjust the upper platen with respect to the press head so that varying thicknesses of molds may be accommodated and so that they will close firmly together at the lower limit of press head travel, the press is designed with an upper platen adjusting means which is located wholly within the upper steam dome. To secure this result, the upper steam dome is provided with an adjusting mechanism having an operating means projecting through the dome so that the necessary adjustment may be made from the exterior of the steam dome.

It is also an object of the invention to provide an adjusting means which, while it gives any desired adjustment of the upper mold section with respect to the lower mold section, will at the same time hold the upper mold section in its proper position of registration so that the engraving on the two mold sections will always be in proper alignment.

In my prior application Serial No. 445,922, filed June 5, 1942, there is shown a press of this type in which the required spacing between the mold sections has been secured by rotating the platen, to which one of the mold sections is attached, with respect to the other. This arrangement required that an adjustable connection be provided between the steam chest dome and the press head. While this scheme was thoroughly practical, it required considerable work to assure that the molds were properly registered at the position of adjustment and the mechanism was quite complicated.

In the design of press shown herein, which is an improvement upon my prior invention, the two mold sections are always in register at every position of adjustment, and this result is obtained by guiding the upper or movable mold section in the dome so that it moves in a straight line toward and from the other mold section to any determined degree without destroying the register between the mold sections. The mechanism for adjusting the movable mold section is greatly simplified and improved and, except for the operating lever, is completely enclosed in the steam chamber. Also, the present design eliminates the necessity for having an adjustable connection between the press head and the steam chest dome, and these two elements can be fixedly secured together.

It will be understood that while in the above description and in the specific form of the invention, the upper mold section is moved to secure the requisite adjustment along the axis of the mold, the position of the parts may be reversed and the lower section moved to secure the adjustment. It will also be understood that while the movable platen is the one to which the upper mold section is secured, the press may be opened and closed by shifting the lower platen, or indeed both platens may be moved during the opening and closing of the press.

In the drawings and description a particular form of press is illustrated and described, but it will be understood that any standard or selected type of press may be equipped with the features constituting the invention. It will also be understood that changes and modifications may be made in embodiments of the invention without departing therefrom.

Figure 1:
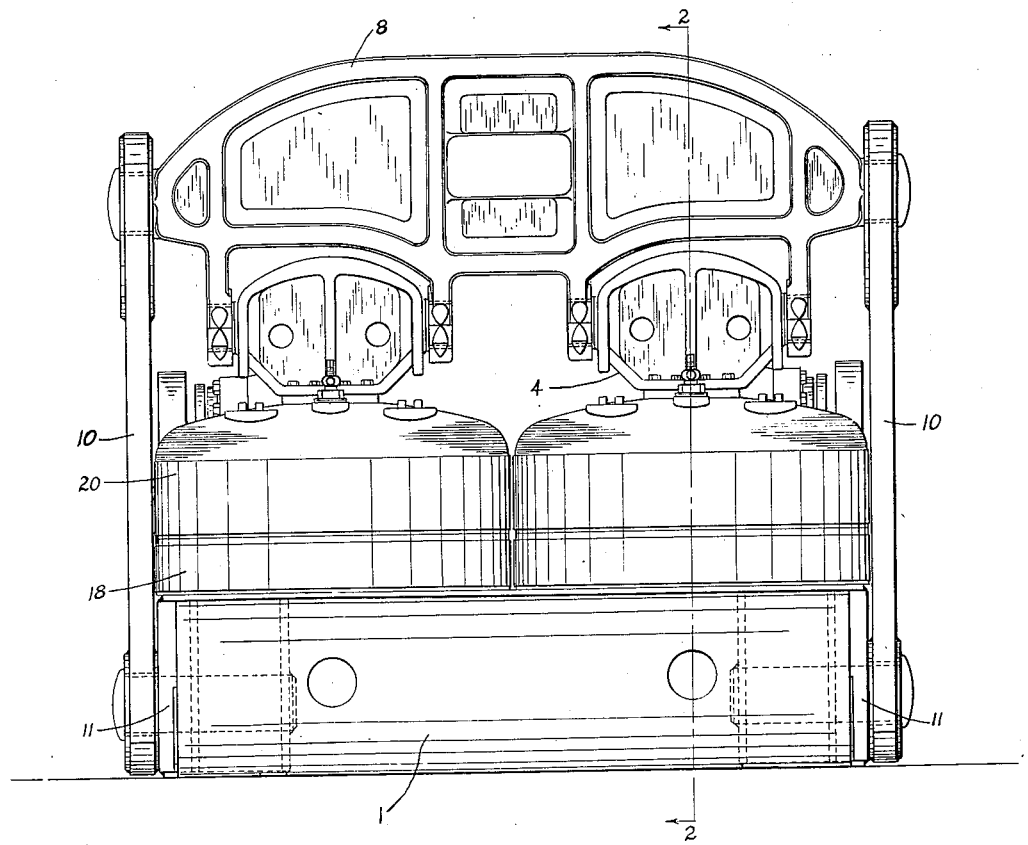
Fig. 1 is a front elevation of a standard form of press in which the invention is incorporated, this particular design being of the dual or twin form.

In the drawings the details of the mounting of the lower or stationary mold section on its fixed support have been omitted as any suitable means may be employed for this purpose. Reference to my prior application above identified will show a suitable arrangement for the purpose.

Figure 2:
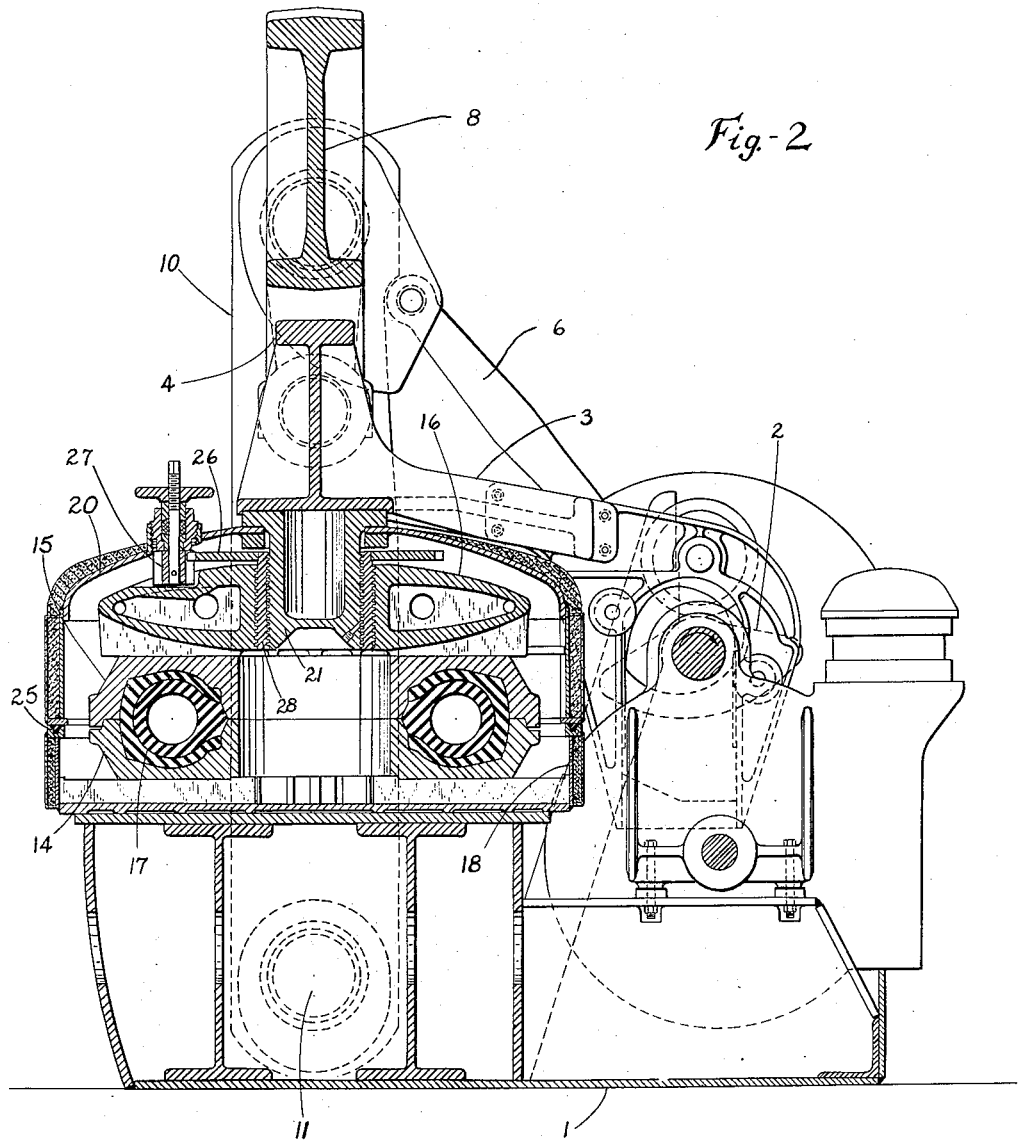
Fig. 2 is a vertical section through one of the press heads while the press is in closed position.
Figure 4:
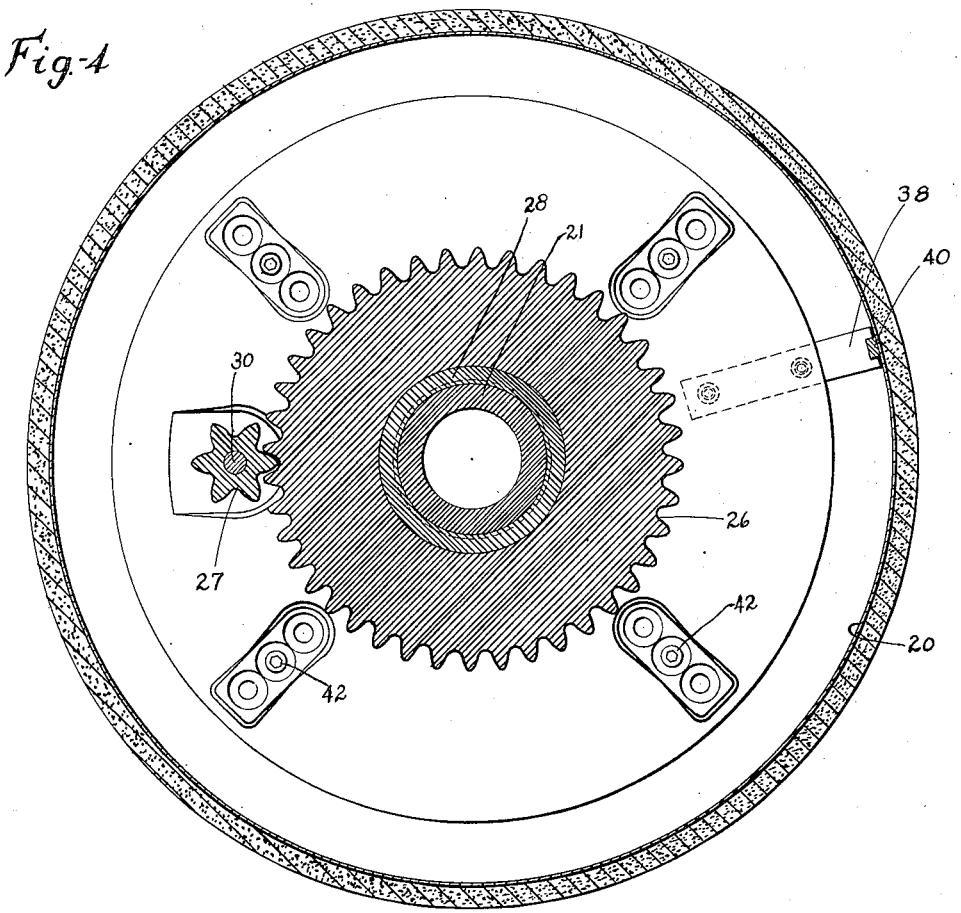
Fig. 4 is a section on the line 4—4 of Fig. 3.
Figure 3:
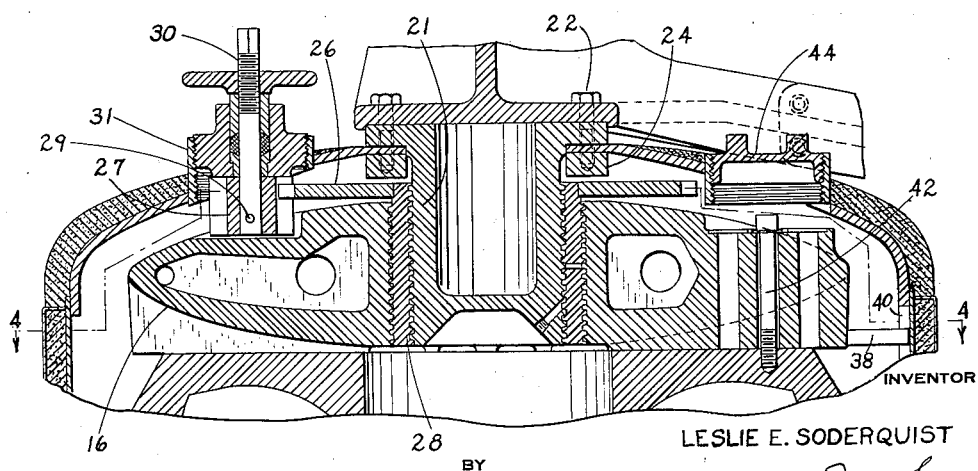
Fig. 3 is an enlarged detail of the means for mounting and adjusting the movable platen within the steam chamber, the details of molds and attachments being omitted.

Referring to the drawings, 1 represents the base of a vulcanizing press with which the invention may be employed, the particular design of press being of the type generally known and recognized as the "self-stripping" type in which the upper mold section is shifted laterally as the mold is opened so as to seize and strip the tire automatically. The cam mechanism for performing this operation during the raising of the upper mold section is indicated in general at 2 in Fig. 2 and need not be described in detail, it being sufficient to state that an arm 3 extends from the crosshead 4 which carries the upper platen to the cam mechanism for guiding the platen in its lateral movement.

The press is opened and closed through links 6 connected to the main transverse beam 8 which extends across the press and is pivotally mounted in a pair of upright swinging arms 10 pivotally mounted in the base 1 at 11, the whole mechanism constituting a powerful toggle mechanism for closing and opening the press. In the particular adaptation of the invention, the beam 8 is of sufficient dimensions to support two crossheads and molds so that the press is of the twin or dual type, but the invention may be employed in a single press design.

To the base of the press is attached the lower or fixed shell section 18 to which is affixed the lower mold section 14. The upper mold section 15 is affixed to the upper or movable platen 16. The tire on its air bag is indicated at 17. The usual connections for steam to the steam box and pressure to the air bag are omitted as these necessary adjuncts may be supplied as desired.

The upper or larger shell section or steam dome 20 is attached to a central, fixed, threaded trunnion 21, this assembly being fixedly secured to the crosshead 4 by a series of bolts 22 which enter a lower clamping ring 24. The shell sections 18 and 20 cooperate to form a steam chamber 23 and a sealing gasket 25 is located at the meeting line between the two steam chamber sections. The chamber is covered with a heavy and serviceable insulation so that there is very little loss of heat by radiation.

The problem in connection with the mounting of mold sections as shown herein within a steam chamber is due to the wide variations in total thickness of the mold comprised by the two sections. The mechanism which is shown herein affords an easy and efficient means to adapt any press to the wide range of molds which it may be called upon to handle and to permit the tire manufacture to interchange molds readily and without undue labor. The two mold sections must not only close tightly together at the end of the closing movement, but the two sections must register accurately so that the non-skids are properly formed in the tire.

In my prior application the means to adapt a press to this work is quite complicated. The variation between the thicknesses of mold sections was taken care of primarily by a platen which was adjustable by rotating it about a boss fixed on the interior of the steam chamber. However, this did not completely fill the requirements, for the platen could be fixed only at points where the mold sections were in register. To compensate for any additional adjustment necessary to secure a tight fit between the mold sections and shell sections, provision was made to adjust the spacing between the press crosshead and the steam dome. As will be seen by the further description of the present invention, the proper adjustment of the crosshead is performed by a novel arrangement which not only assures that the molds are in register, but that the requisite tight closure of the mold and steam chamber is always maintained.

These desirable results are secured in the following manner:

The outer surface of the trunnion 21 is screw-threaded and over this is threaded an intermediate ring or sleeve 28, the outer surface of which is also screw-threaded. The two sets of screw threads are in opposite directions, that is to say, the threads on the trunnion 21 may be right-handed and the threads on the outside of the ring 28 may be left-handed or vice versa. The platen 16 is threaded onto the ring 28.

To the upper end of the ring 28 is attached the large ring gear 26 which is engaged by the operating pinion 27. All of the mechanism which has just been described is within the steam dome. The pinion 27 is attached by means of pin 29 to the lower end of a shaft 30 which projects through the steam dome, being mounted in a steam-tight bushing 31 set in the dome. The upper end of the shaft 30 is made square to accommodate a wrench or other suitable turning means. This shaft 30 may be rotated in either direction so that the operator may turn the gear 27 and shaft in either direction which, through the gear 26, rotates the sleeve and raises or lowers the platen to any desired extent because it is prevented from turning by a keyway or guide 38 engaging a key 40 in the vertical inside wall of the steam dome. With the relatively fine adjustment permitted by the double-threaded sleeve it is not necessary to provide for any adjustment between the upper shell member and the crosshead to insure tight closure of the mold sections and steam chamber.

As the platen 16 is not rotated during the adjustment, the upper mold section 15, which is attached to the platen by bolts 42, is maintained at all times in its initial position of registration with the lower mold section. Steam-tight covers 44 may be provided in the steam dome above the bolts for ready access thereto, it being noted that provision is made in the platen for several bolt openings for the accommodation of different sizes of molds. Appropriate means (not shown) are likewise provided in the lower steam box to accommodate different sizes of molds.

It will be seen that the mechanism is extremely simple and effective to perform the hitherto difficult and time consuming operation of making any standard press adaptable for varying mold units.

What is claimed is:

1. In a vulcanizing press of the character described having a pair of press sections forming a curing chamber, at least one of which sections is movable to open and close the press, a movable press head to which said movable press section is fixedly secured and having a portion extending within said chamber, a platen within said chamber, means within said chamber for relatively spacing said press head and said platen, comprising a rotatable member having threaded engagement with said platen and with said extending portion of said press head, means for turning said rotatable member, and means within said chamber to hold said platen and said press head in fixed angular position with respect to each other during turning movement of said rotatable member.

2. A vulcanizing press of the type referred to in claim 1 wherein said last named means comprises a key carried by said movable press section within said chamber, said platen being provided with a keyway in which said key is received.

3. A vulcanizing press of the type referred to in claim 1 wherein said rotatable member has threaded engagement in one direction with said platen and in the opposite direction with said press head.

4. In a vulcanizing press of the character described having upper and lower press sections forming a curing chamber, at least the upper of which sections is movable to open and close the press, a movable press head to which said upper press section is fixedly secured and having a portion extending within said chamber, a platen within said chamber, means within said chamber for relatively spacing said press head and said platen, comprising a rotatable member having threaded engagement with said platen and with said extending portion of said press head, means for turning said rotatable member, and means within said chamber to hold said platen and said press head in fixed angular position with respect to each other during turning movement of said rotatable member.

5. A vulcanizing press of the type referred to in claim 4 wherein said last named means comprises a key carried by said upper press section within said chamber, said platen provided with a keyway in which said key is received.

6. A vulcanizing press of the type referred to in claim 4 wherein said rotatable member has threaded engagement in one direction with said platen and in the opposite direction with said press head.

7. In a vulcanizing press of the character described having a pair of press sections forming a curing chamber, at least one of which sections is movable to open and close the press, a movable supporting member to which said movable press section is fixedly secured and having a portion extending within said chamber, a platen within said chamber, means within said chamber for relatively spacing said press head and said platen, comprising a rotatable tubular sleeve having threads on both its inner and outer peripheries, one set of threads having engagement with said platen and the other set of threads having engagement with said extending portion of said supporting member, and means for turning said sleeve.

8. A vulcanizing press of the type referred to in claim 7 wherein the threads on the inner periphery of said sleeve run in one direction and the threads on the outer periphery of said sleeve run in the opposite direction.

9. A vulcanizing press of the type referred to in claim 7 wherein means are provided within said chamber to hold said platen and said supporting member is fixed angular position with respect to each other during turning movement of said sleeve.

10. A vulcanizing press of the type referred to in claim 7 wherein said last named means comprises a gear carried by said sleeve within said chamber, a pinion meshing with said gear within said chamber, and a shaft carrying said pinion, said shaft extending outwardly of said chamber and adapted to turn said pinion in either direction.

11. In a vulcanizing press of the character described having upper and lower press sections forming a curing chamber, at least the upper of which sections is movable to open and close the press, a movable supporting member to which said upper press section is fixedly secured and having a portion extending within said chamber, a platen within said chamber, means within said chamber for relatively spacing said supporting member and said platen, comprising a rotatable tubular sleeve having threads on both its inner and outer peripheries, one set of threads having engagement with said platen and the other set of threads having engagement with said extending portion of said supporting member, and means for turning said sleeve.

12. A vulcanizing press of the type referred to in claim 11 wherein the threads on the inner periphery of said sleeve run in one direction and the threads on the outer periphery of said sleeve run in the opposite direction.

13. A vulcanizing press of the type referred to in claim 11 wherein means are provided within said chamber to hold said platen and said supporting member in fixed angular position with respect to each other during turning movement of said sleeve.

14. A vulcanizing press of the type referred to in claim 11 wherein the last named means comprises a gear carried by said sleeve within said chamber, a pinion meshing with said gear within said chamber, and a shaft carrying said pinion, said shaft extending outwardly of said chamber and adapted to turn said pinion in either direction.

LESLIE EDWARD SODERQUIST.